Patented Jan. 8, 1929.

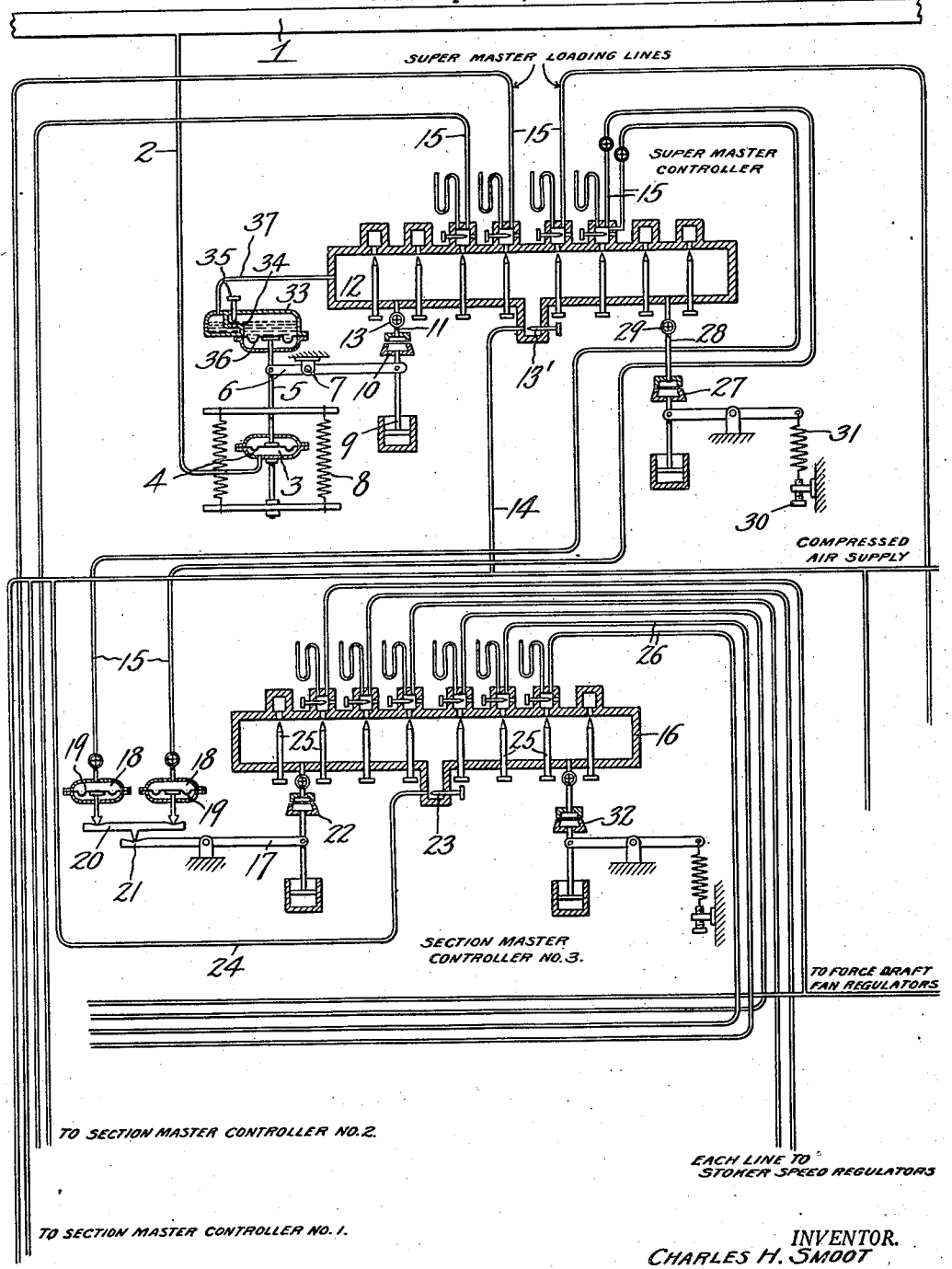

1,698,031

UNITED STATES PATENT OFFICE.

CHARLES H. SMOOT, OF MAPLEWOOD, NEW JERSEY.

CENTRALIZED CONTROL SYSTEM.

Application filed April 7, 1927. Serial No. 181,713.

This invention relates to a control system for governing the output of industrial producing plants where such output is controlled by a master regulator which automatically correlates the various controls of the elements contributing to the common output. In my Reissue Patent No. 16,507 of December 21, 1926, I have described such a master control system.
The present invention is especially adapted to large plants where it is desirable to divide the units into groups that may, as desired, be controlled differently from other groups, or cut out from the master control, and comprises the combination of section master controllers and a super master controller, which has means responsive to the fluctuations of a function of the common output of the plant to produce a controlling force variable with the variations of said function and communicating means leading from the super master controller to the section master controllers, whereby the latter will be varied correlatively with the response of the super master controller to the requirements.

The invention further comprises means associated with the super master controller for introducing a compensating element whereby after a change in the function to be regulated persists, a change will be made in the adjustments of the regulator so as to compensate for the change while allowing the function to be returned to normal.

The invention further comprises means for insuring the uninterrupted operation of the controlling system in case of failure of some of the communicating means to and from the controllers. In the present invention this is accomplished by providing duplicate communicating means and combining therewith means whereby under normal conditions, the duplicate means will act conjointly to operate the controlled device and upon failure of either of the communications, the remaining one will alone operate the controller with the same force as did the two combined.

Other combinations will be described in connection with the accompanying drawing which represents schematically a system of controls embodying an example of my invention.

At 1 is shown a main supply pipe which may, for example, be the main steam pipe of a power plant. From this pipe a conduit 2 leads to a chamber 3 which is closed by a dipahragm 4, the rod 5 of which is connected to a lever 6, pivoted at 7 and having a loading device 8 which is shown as a spring. The lever 6 is connected through rod 9 with a cup valve 10 adapted to close the escape from pipe 11 which connects with a chamber 12 through a valve 13. Chamber 12 is adapted to contain compressed air supplied thereto through a needle valve 13' from a pipe 14 connected to a source of compressed air supply. The mechanism thus described has the function of varying the pressure in chamber 12 inversely as the pressure in pipe 1, the variation in chamber 12, however, being at a much greater ratio than the variation in pipe 1. A slight fall, for example, in pressure in pipe 1, allowing air to escape with less rapidity past the cup valve 10, increases to an exaggerated degree, the pressure in chamber 12. The mechanism forms a means that is responsive to a change of a function, in this case the pressure of the fluid flowing in pipe 1, which change is an indication of a change in the demand for production of the common output. From the chamber 12, a number of communicating means, such as pipes 15, lead to other chambers forming parts of other regulating apparatus designed to each control a separate section of elements that are contributing to the product supplied to pipe 1. At 16 is shown such a chamber which is similar to that shown at 12, but instead of having the fixed loading such as 8, has its loading device or lever 17 under the influence of the communicating means 15 from chamber 12.

As shown in the drawing, I prefer to make these communicating means in duplicate as, for example, two pipes leading from chamber 12 to chambers 18 having diaphragms 19 that bear with equal force on the opposite ends of the lever 20, pivoted in the middle at 21 to the end of the load lever or device 17, the latter controlling a cup valve 22 which in turn controls the escape of air from chamber 16, the said chamber being supplied through a needle valve 23 by pipe 24 leading to the source of compressed air supply. The mechanism just described will cause the pressure in chamber 16 to respond proportionately to the pressure in chamber 12. Chamber 16 is one of a plurality of master controllers each having means for controlling individual elements contributing to the product in pipe 1. For example, there are shown leading from chamber 16 through needle valves 25, communicating means such as pipes 26 leading to local controls which will regulate the elements which are contributory to the product in pipe 1. In the case of a steam generating plant, these communicating means would control individually, for example, the forced draft, the fuel feed, stack damper, boiler feed water, or any other elements the supply of which should vary in accordance with the requirements. The fluctuations in the requirements of the common output as, for example, the demand for steam will be indicated by a function of the steam such as a fall or rise of pressure in pipe 1 so that the fluctuation in demand will, by the variation brought about thereby in chamber 12, cause a similar variation to occur in all of the subsidiary control chambers 16, which will in proper manner pass on the demand to the various local controls whose duty it is to vary the supply of the elements entering into the common output in pipe 1. By making the communicating means in duplicate, the failure as by breakage of any of the communicating means, will not cause the apparatus to cease to function, for if the pressure is relieved from one of the diaphragms 19 by the failure of the supply pipe leading thereto, such diaphragm will be pushed to its limit of play and the work of regulation will be entirely taken up by the remaining diaphragm 19 which, acting now with twice the leverage, will, with the same amount of pressure coming through chamber 12, give the same effect of load upon the device 17 as if both diaphragms 19 were acting conjointly. Such a duplication of communicating conductors or conduits may evidently be used in any part of the system.

At 27 is shown a release valve similar to the one shown at 10 which, by means of pipe 28 and valve 29, may enable an operator through screw 30 to vary the load 31 to control manually the pressure in chamber 12 and thus give the means of manually operating the controlling system. In such cases, the valve 13 in pipe 11 would be closed. A similar manual control may be installed for each of the chambers 16 of the section masters as shown at 32. The chambers 16 and their connected apparatus form section master controllers, each having control of a section of the plant, while the chamber 12 and its connecting mechanism forms a super master controller for correlatively regulating all the section master controllers. The super master alone is made responsive to the requirements of the common output in pipe 1, and by its communicating means, connecting it with the group master controllers, it distributes the loading in any predetermined manner, to various section controllers, which in turn through their subsidiary communicating means proportion out the control to the local controls of the various elements that go to the formation of the general output of the plant.

In the operation of the apparatus, when a change takes place in the pipe 1, the lever 6 will move, causing a change in the opening of valve 10 to bring about a change of pressure in chamber 12. The lever 6 will continue to move until the forces exerted upon the lever 6, including those due to the pressure at cup 10 and to the pressure upon diaphragm 3 are such as to maintain a balance thereupon. The change in pressure in chamber 12 effects the section controllers and through them the local controls to bring about a change in the supply of elements tending to prevent further change in the condition in pipe 1. The pressure in pipe 12 would have therefore so far as the operation of the apparatus above described is concerned, a definite value for each setting of the lever 6 corresponding to definite values of the condition in pipe 1.

I prefer, however, to associate with the super master controller, means for introducing a compensating element whereby after a change in the function to be regulated persists, a change will be made in the adjustments of the regulator so as to compensate for the change while allowing the function to be returned to normal with the result that the value of the controlling force depends not upon the actual value of the function to be regulated, but upon the magnitude of the changes from normal occurring therein and upon the duration of these variations from normal. Such associated compensating means forms no part of my present invention as it forms the subject matter of my copending application, Serial No. 143,414, filed October 22, 1926. I have, however, shown at 33 such compensating means as illustrating the preferred form of my centralized control system. The device 33 comprises a casing divided into two compartments by a partition 34 in which is an orifice regulatable by an adjusting screw 35. Mercury or other fluid in the chamber is carried at such a level as to cover the opening in the partition. One section of the chamber has a diaphragm 36' whereby the weight of the mercury and the pressure transmitted to it is added to the loading of lever 6. The other chamber has a pipe 37 in communication with the chamber 12. The pressure upon diaphragm 36 acts upon a lever 6 through the rod 5 to which the diaphragm is attached. The location of the pivot 7 is so chosen that the turning moment offered to the lever 6 by the pressure upon diaphragm 36 is practically equal and opposite to that offered by the pressure in chamber 12 through cup 10 when these pressures are equal. If the pressure in pipe 1 decreases, for instance, indicating a need for increase in the supply of element, an unbalance occurs upon the lever 6 in a direction to close valve 10 to increase the pressure in chamber 12. The increase in pressure in chamber 12 will react immediately upon the lever 6 through the cup 10 but only after a definite time interval will this change be felt upon diaphragm 36. The pressure in pipe 1 will gradually increase due to the increased supply of elements called for by the increase in pressure in chamber 12, and, at the same time the pressure upon diaphragm 36 will increase to the value of that in chamber 12 by the forcing of liquid through the orifice. Preferably the equalization of pressures upon diaphragm 36 and cup 10 will be completed at the moment that the pressure in pipe 1 returns to the desired value as determined by springs 8. The element 33 thus permits the pressure in chamber 12 to be independent of the actual pressure in pipe 1 but to be dependent upon the direction and duration of the changes from normal of this pressure.

It will be apparent that my control system comprising a super master and the various section masters, when applied for instance to the control of a boiler plant, permits the control of the whole plant from a central point. If it is desired to cut out a certain group of boilers, it is only necessary to close the connections at the super master to the communicating lines 15 leading to the section master controlling that particular group of boilers. Similarly the different groups of boilers may be operated at different ratings by proper adjustment at the super master. Any group may readily be transferred from automatic to manual control or the entire plant may be placed under manual control directly from the super master if desired.

While I have shown the application of the invention to an example more particularly adapted for steam production in a power plant, it will be obvious that in its broader aspects, the invention is equally applicable to the regulation and control of any industrial plant in which a number of variable elements are made to contribute to a common output.

In the example above described, the communicating means to and from the controllers are shown as pipes conveying compressed air. The medium for conveying the force may equally well be electricity or any other suitable medium and the words "fluid" and "conduits" or "conductors" are intended to be used in their broadest sense in the following claims.

I claim:—

1. A control system adapted to regulate various elements contributing to a common output, comprising a super master controller producing a controlling force, and a plurality of section master controllers cooperatively related to the supermaster to produce forces responsive to said controlling force.

2. A control system adapted to regulate various elements contributing to a common output, comprising a super master controller producing a controlling force responsive to fluctuations of a function of the output, and a plurality of section master controllers cooperatively related to the supermaster to produce forces responsive to said controlling force.

3. A control system adapted to regulate various elements contributing to a common output, comprising a super master controller connected with a source of fluid under pressure and regulatable to vary the pressure of said fluid, a plurality of section master controllers also connected to a source of fluid under pressure, and means cooperatively relating the supermaster to the section masters to vary the fluid pressure of each section master responsively to variations of the supermaster pressure.

4. A control system adapted to regulate various elements contributing to a common output, comprising a super master controller, a plurality of section master controllers, means at each section master for controlling the said variable elements, loading means for each of said section master controllers, the super master controller having means responsive to the fluctuations of a function of the common output, loading means for the same and communicating means leading from the super master controller to the section master controllers whereby the loadings of the section master controllers are rendered responsive to changes in the super master controller engendered by the fluctuations of the common output.

5. A control system adapted to regulate various elements contributing to a common output, comprising a super master controller, a plurality of section master controllers, means at each section master for controlling the said variable elements, loading means for each of said section master controllers, the super master controller having means responsive to the fluctuations of a function of the common output, loading means for the same, and communicating means leading from the super master controller to the section master controllers whereby the loadings of the section master controllers are rendered responsive to changes in the super master controller engendered by the fluctuations of the common output, with time delay means connected to the loading means of the super master controller to permit immediate response to fluctuations of the common output and after a predetermined lapse of time to change the said loading to meet the new requirements.

6. A control system adapted to regulate various elements contributing to a common output, comprising a super master controller, a plurality of section master controllers, means at each section master for controlling the said variable elements, loading means for each of said section master controllers, the super master controller having means responsive to the fluctuations of a function of the common output, loading means for same and communicating means leading from the super master controller to the section master controllers whereby the loadings of the section master controllers are rendered responsive to changes in the super master controller engendered by the fluctuations of the common output, with manual control means at the super master, and means for cutting off the means responsive to the requirements and substituting the manual control means.

7. A control system adapted to regulate various elements contributing to a common output, comprising a super master controller, a plurality of section master controllers, means at each section master for controlling the said variable elements, loading means for each of said section master controllers, the super master controller having means responsive to the fluctuations of a function of the common output, loading means for same and communicating means leading from the super master controller to the section master controllers whereby the loading of the section master controllers is rendered responsive to changes in the super master controller engendered by the fluctuations of the common output, with manual control means at the section master, and means for cutting off the means responsive to the super master and substituting the manual control means.

8. A control system adapted to regulate various elements contributing to a common output, comprising a super master controller, a plurality of section master controllers, means at each section master for controlling the said variable elements, loading means for each of said section master controllers, the super master controller having means responsive to the fluctuations of a function of the common output, loading means for the same and communicating means leading from the super master controller to the section master controllers whereby the loadings of the section master controllers are rendered responsive to changes in the super master controller engendered by the fluctuations of the common output, with manual control means at the super master and section masters, and means for cutting off the means responsive to the requirements at the super master and to the super master at the section master and substituting the manual control means.

9. In a regulator, the combination comprising a master controller, a subcontroller, means for regulating said subcontroller and duplicate means for transmitting force from said master controller to said regulating means, said regulating means being adapted to utilize the combined force of the duplicate transmitting means for regulating the subcontroller and in case of failure of one of the transmitting means to enable the remaining means to act with the same force as did the two transmitting means when acting conjointly.

10. In a regulator, the combination comprising a master controller connected with a source of fluid under pressure and regulatable to vary the pressure of said fluid, a subcontroller, duplicate conductors for conveying said fluid to the subcontroller, and means operatable by the fluid flowing through such conductors to regulate the subcontroller through either one of the conductors acting alone or by both conductors acting conjointly with the same force as either one acting alone.

11. In a regulator, the combination comprising a master controller connected with a source of fluid under pressure and regulatable to vary the pressure of said fluid, a subcontroller, duplicate conduits for the said fluid leading from the master controller to the subcontroller, means for regulating the subcontroller, means connected with each of the conduits responsive to fluctuations of the pressure in the conduit with which it is connected, each of said responsive means normally bearing with equal force upon the said regulating means and upon failure of pressure in one of the conduits allowing the responsive means of the other conduit to bear upon the regulator with twice the force.

12. A control system adapted to regulate various elements contributing to a common output, comprising a supermaster controller connected with a source of fluid under pressure and regulatable to vary the pressure of said fluid, a plurality of section master controllers likewise connected to a source of fluid under pressure, means cooperatively relating the supermaster to the section masters to vary the fluid pressure of each section master responsively to variations of the supermaster pressure, and lines leading from said section masters to deliver regulatable controlling pressures therefrom.

CHARLES H. SMOOT.